US009222414B2

(12) United States Patent
Eto et al.

(10) Patent No.: US 9,222,414 B2
(45) Date of Patent: Dec. 29, 2015

(54) FUEL SUPPLY SYSTEM FOR GAS TURBINE COMBUSTOR AND FUEL SUPPLY METHOD FOR GAS TURBINE COMBUSTOR

(75) Inventors: Yosuke Eto, Tokyo (JP); Ken Ugai, Tokyo (JP); Yoshikiyo Okamoto, Tokyo (JP); Ryo Higashi, Tokyo (JP); Takeo Hirasaki, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 1217 days.

(21) Appl. No.: 13/064,509

(22) Filed: Mar. 29, 2011

(65) Prior Publication Data

US 2012/0042658 A1    Feb. 23, 2012

(30) Foreign Application Priority Data

Aug. 20, 2010    (JP) ................................. 2010-184794

(51) Int. Cl.
     *F02C 7/22*      (2006.01)
     *F23R 3/36*      (2006.01)
     (Continued)

(52) U.S. Cl.
     CPC ... *F02C 7/22* (2013.01); *F02C 3/22* (2013.01); *F02C 3/28* (2013.01); *F02C 7/232* (2013.01);
     (Continued)

(58) Field of Classification Search
     CPC .............. F02C 7/264; F02C 7/26; F02C 3/22; F02C 7/22; F23R 3/36; F23R 3/28; F23K 2900/05004; F23N 2037/08
     USPC .......... 60/776, 778, 780, 39, 12, 786, 39.464, 60/39.463, 742, 737
     See application file for complete search history.

(56) References Cited

U.S. PATENT DOCUMENTS

| 4,833,878 A | * | 5/1989 | Sood et al. ...................... 60/778 |
| 6,199,366 B1 | | 3/2001 | Murata et al. |

(Continued)

FOREIGN PATENT DOCUMENTS

| CN | 101526217 A | 9/2009 |
| CN | 101793197 A | 8/2010 |

(Continued)

OTHER PUBLICATIONS

International Search Report of PCT/JP2011/055307, date of May 31, 2011.

(Continued)

*Primary Examiner* — William H Rodriguez
*Assistant Examiner* — Thomas Burke
(74) *Attorney, Agent, or Firm* — Westerman, Hattori, Daniels & Adrian, LLP (57) ABSTRACT

A consumption amount of high-calorific gas such as coke oven gas (COG) during operation of a gas turbine is reduced, halt of the gas turbine due to clogging of a pilot system, a malfunction of a compressor which compresses high-calorific gas is prevented, and reliability of the gas turbine is improved. When operation of the gas turbine (11) starts, with use of both a first fuel supply system (31) which supplies a high-calorific fuel for a first nozzle constituting a combustor (17), and a second fuel supply system (32) which supplies a low-calorific fuel for a second nozzle constituting the combustor (17), the high-calorific fuel and the low-calorific fuel are supplied to the combustor (17), and at a time when the gas turbine (11) reaches output power which enables continuous operation with only the low-calorific fuel, supply of the high-calorific fuel to the combustor (17) is shut off, and only the low-calorific fuel is supplied to the combustor (17).

5 Claims, 4 Drawing Sheets

(51) Int. Cl.
*F02C 3/22* (2006.01)
*F02C 7/26* (2006.01)
*F23K 5/00* (2006.01)
*F02C 3/28* (2006.01)
*F02C 7/232* (2006.01)
*F02C 9/40* (2006.01)

(52) U.S. Cl.
CPC ... *F02C 7/26* (2013.01); *F02C 9/40* (2013.01); *F23K 5/002* (2013.01); *F23R 3/36* (2013.01); *F05D 2220/75* (2013.01); *F23K 2400/00* (2013.01); *F23K 2900/05004* (2013.01); *F23N 2037/08* (2013.01); *F23R 2900/00002* (2013.01); *Y02E 50/12* (2013.01)

(56) References Cited

U.S. PATENT DOCUMENTS

| | | | |
|---|---|---|---|
| 6,385,960 | B1 | 5/2002 | Kress et al. |
| 8,438,830 | B2 * | 5/2013 | Lawson et al. ............. 60/39.463 |
| 2003/0056517 | A1 | 3/2003 | Brushwood et al. |
| 2004/0172951 | A1 * | 9/2004 | Hannemann et al. ........... 60/776 |
| 2006/0087294 | A1 | 4/2006 | Kataoka et al. |
| 2006/0119202 | A1 | 6/2006 | Kataoka et al. |
| 2009/0223226 | A1 | 9/2009 | Koizumi et al. |
| 2009/0272118 | A1 * | 11/2009 | Alexander ................ F02C 3/22 60/772 |
| 2010/0229524 | A1 * | 9/2010 | Bhatnagar et al. ......... 60/39.463 |

FOREIGN PATENT DOCUMENTS

| | | |
|---|---|---|
| DE | 195 49 141 A1 | 7/1997 |
| EP | 0 915 242 A2 | 5/1999 |
| JP | 07-102998 A | 4/1995 |
| JP | 09-145011 A | 6/1997 |
| JP | 11-210495 A | 8/1999 |
| JP | 3110300 B2 | 11/2000 |
| JP | 2005-146963 A | 6/2005 |
| JP | 2006-125255 A | 5/2006 |
| JP | 2006-161603 A | 6/2006 |
| JP | 4206908 B2 | 1/2009 |
| JP | 2009-210200 A | 9/2009 |
| JP | 2009-270570 A | 11/2009 |
| JP | 2009-270575 A | 11/2009 |

OTHER PUBLICATIONS

Kroean Patent Application No. 10-2012-7031141 Decision to Grant dated Apr. 11, 2014 (2 pp).
Japanese Patent Application No. 2010-184794 Decision to Grant dated Mar. 18, 2014 (3 pp).
Chinese Office Action dated Jun. 24, 2014, issued in corresponding Chinese application No. 201180031424.9 w/ English translation (13 pages).
Extended European Search Report dated Nov. 13, 2014, issued in corresponding EP application No. 11817951.4. (6 pages).
Notification on the Grant of Patent dated Jan. 13, 2015, issued in CN application No. 201180031424.9, with English Translation (4 pages).

* cited by examiner

FUEL SUPPLY SYSTEM FOR GAS TURBINE COMBUSTOR AND FUEL SUPPLY METHOD FOR GAS TURBINE COMBUSTOR

CROSS-REFERENCE TO RELATED APPLICATIONS

This application is based on Japanese Patent Application No. 2010-184794, the contents of which are incorporated herein by reference.

TECHNICAL FIELD

The present invention relates to a fuel supply system for a gas turbine combustor which supplies low-calorific gas such as blast furnace gas (BFG) to a gas turbine combustor as a main fuel and a fuel supply method for the gas turbine combustor.

BACKGROUND ART

As a fuel supply system for a gas turbine combustor which supplies low-calorific gas such as blast furnace gas (BFG) to the gas turbine combustor as a main fuel and a fuel supply method for the gas turbine combustor, for example, those disclosed in FIG. 5 of Patent Literature 1 are known.

CITATION LIST

Patent Literature

{PTL 1}
Japanese Unexamined Patent Application, Publication No. Hei 7-102998

In those disclosed in FIG. 5 of the above described Patent Literature 1, low-calorific gas such as blast furnace gas (BFG) is always supplied from a gas nozzle constituting a combustor through a main system, and high-calorific gas such as coke oven gas (COG) is always supplied from a gas nozzle constituting the combustor through a pilot system.

SUMMARY OF INVENTION

Technical Problem

However, the consumption cost of high-calorific gas such as coke oven gas (COG) is high as compared with low-calorific gas such as blast furnace gas (BFG), and therefore, in recent years, the users have made a number of requests for reduction in the consumption amount of high-calorific gas such as coke oven gas (COG) during operation of gas turbines.

Further, high-calorific gas such as coke oven gas (COG) contains numerous impurities as compared with low-calorific gas such as blast furnace gas (BFG). Accordingly, due to such impurities, clogging occurs to pilot systems, malfunctions occur to COG compressors for supplying COG to gas turbine combustors, and gas turbines sometimes trip (emergently stop).

Further, there is the fear that as a result of the pilot system being clogged, high-calorific gas such as coke oven gas (COG) is not supplied to a pilot nozzle, and the combustion gas in the combustor flows back into the pilot nozzle to cause a fire.

Furthermore, the maintenance for eliminating (solving) clogging of the pilot systems and malfunctions of the COG compressor is required, and there have been the problems of reduction in the availability of the gas turbine and steep increase in maintenance cost.

The present invention is made in view of such circumstances, and has an object to provide a fuel supply system for a gas turbine combustor and a fuel supply method for the gas turbine combustor, which can reduce a consumption amount of high-calorific gas such as coke oven gas (COG) during operation of a gas turbine, can prevent halt of the gas turbine due to clogging of a pilot system, a malfunction of a compressor which compresses the high-calorific gas and the like, and can enhance reliability of the gas turbine.

Solution to Problem

In order to solve the above described problem, the present invention adopts the following solution.

A fuel supply method for a gas turbine combustor according to the first aspect of the present invention is a fuel supply method for a gas turbine combustor which supplies at least two kinds of fuels different in calorie to the gas turbine combustor, wherein at a time of start of operation of the gas turbine, with use of both a first fuel supply system which supplies a high-calorific fuel for a first nozzle constituting the gas turbine combustor, and a second fuel supply system which supplies a low-calorific fuel for a second nozzle constituting the gas turbine combustor, the high-calorific fuel and the low-calorific fuel are supplied to the gas turbine combustor, and at a time point when the gas turbine reaches output power which enables continuous operation with only the low-calorific fuel, supply of the high-calorific fuel to the gas turbine combustor is shut off, and only the low-calorific fuel is supplied to the gas turbine combustor.

According to the fuel supply method for a gas turbine combustor according to the first aspect, the consumption amount of high-calorific gas such as coke oven gas (COG) during operation of the gas turbine can be reduced, and the frequencies of clogging of the first fuel supply system (pilot system) and the malfunction of the compressor which compresses the high-calorific gas can be reduced.

In the first aspect, it is more preferable to adopt the configuration wherein when supply of the high-calorific fuel to the gas turbine combustor is shut off, and only the low-calorific fuel is supplied to the gas turbine combustor, the low-calorific fuel guided through the second fuel supply system is guided to the first nozzle through a sweep line which guides the low-calorific fuel to a mid-portion of the first fuel supply system, and the low-calorific fuel is ejected from both the second nozzle and the first nozzle.

According to the above described configuration, even when supply of the high-calorific fuel to the gas turbine combustor is shut off, and only the low-calorific fuel is supplied to the gas turbine combustor, the low-calorific fuel is ejected from both the first nozzle and the second nozzle, and is combusted, and therefore, the combustion gas in the combustor can be prevented from flowing back into the first nozzle (pilot nozzle) and causing a fire.

A fuel supply system for a gas turbine combustor according to the second aspect of the present invention is a fuel supply system for a gas turbine combustor which supplies at least two kinds of fuels different in calorie to a gas turbine combustor, and includes a first fuel supply system which supplies a high-calorific fuel to a first nozzle constituting the gas turbine combustor, a second fuel supply system which supplies a low-calorific fuel to a second nozzle constituting the gas turbine combustor, a sweep line which guides to a mid-portion of the first fuel supply system the low-calorific fuel guided through the second fuel supply system, a sweep valve which is provided at a mid-portion of the sweep line and is for switching inflow/shutoff of the low-calorific fuel guided to the first fuel supply system from the second fuel supply system, and a first shutoff valve which is provided at an upstream side from a position to which a downstream end of the sweep line is connected, of the first fuel supply system, and shuts off supply of the high-calorific fuel which is guided to the first nozzle through the first fuel supply system, wherein at a time point when the gas turbine reaches output power which enables continuous operation with only the low-calorific fuel, the sweep valve is opened and the first shutoff valve is closed.

According to the fuel supply system for a gas turbine combustor according to the second aspect, the consumption amount of the high-calorific gas such as coke oven gas (COG) during operation of the gas turbine can be reduced, and the frequencies of clogging of the first fuel supply system (pilot system) and the malfunction of the compressor which compresses the high-calorific gas can be reduced.

Further, according to the fuel supply system for a gas turbine combustor according to the second aspect, when supply of the high-calorific fuel to the gas turbine combustor is shut off, and only the low-calorific fuel is supplied to the gas turbine combustor, the low-calorific fuel is ejected from both the first nozzle and the second nozzle and is combusted, and therefore, the combustion gas in the combustor can be prevented from flowing back into the first nozzle (pilot nozzle) and causing a fire.

In the second aspect, it is more preferable to adopt the configuration wherein a second shutoff valve is provided at an upstream side from a position to which a downstream end of the sweep line is connected, and at a downstream side of the first shutoff valve, of the first fuel supply system.

According to the above described configuration, the low-calorific fuel which flows into the first fuel supply system through the sweep line can be prevented from flowing into the first fuel supply system which is located at the upstream side from the second shutoff valve.

In the above described configuration, it is more preferable to adopt the configuration wherein an $N_2$ seal line which supplies $N_2$ for seal is connected to the first fuel supply system which is located between the first shutoff valve and the second shutoff valve.

According to the above described configuration, at the time of operation (zero pilot operation) in which only the low-calorific fuel is supplied to the gas turbine combustor, the gas between the first shutoff valve and the second shutoff valve is replaced with $N_2$, and thereby, the combustible gas can be prevented from staying in the first fuel supply system.

A gas turbine according to the third aspect of the present invention includes any one of the above described fuel supply systems for a gas turbine combustor.

According to the third aspect, the consumption amount of the high-calorific gas such as coke oven gas (COG) during operation of the gas turbine can be reduced and also the running cost can be reduced. Furthermore, the frequencies of clogging of the first fuel supply system (pilot system) and the malfunction of the compressor which compresses the high-calorific gas can be reduced, the maintenance cost can be reduced, and reliability of the gas turbine can be improved.

A power generation plant according to the fourth aspect of the present invention includes the above described gas turbine.

According to the power generation plant according to the fourth aspect, since the gas turbine which is low in running cost and maintenance cost with high reliability is equipped (adopted), the running cost and the maintenance cost of the entire power generation plant can be reduced, and the reliability of the entire power generation plant can be improved.

Advantageous Effects of Invention

According to the fuel supply system for a gas turbine combustor and the fuel supply method for the gas turbine combustor according to the present invention, there is provided the effect of being capable of reducing the consumption amount of high-calorific gas such as coke oven gas (COG) during operation of the gas turbine, preventing halt of the gas turbine due to clogging of the pilot system, a malfunction of the compressor which compresses the high-calorific gas and the like, and capable of improving reliability.

DESCRIPTION OF EMBODIMENTS

Hereinafter, a fuel supply system for a gas turbine combustor and a fuel supply method for the gas turbine combustor according to one embodiment of the present invention will be described with reference to FIGS. 1 to 4.

Figure 1:
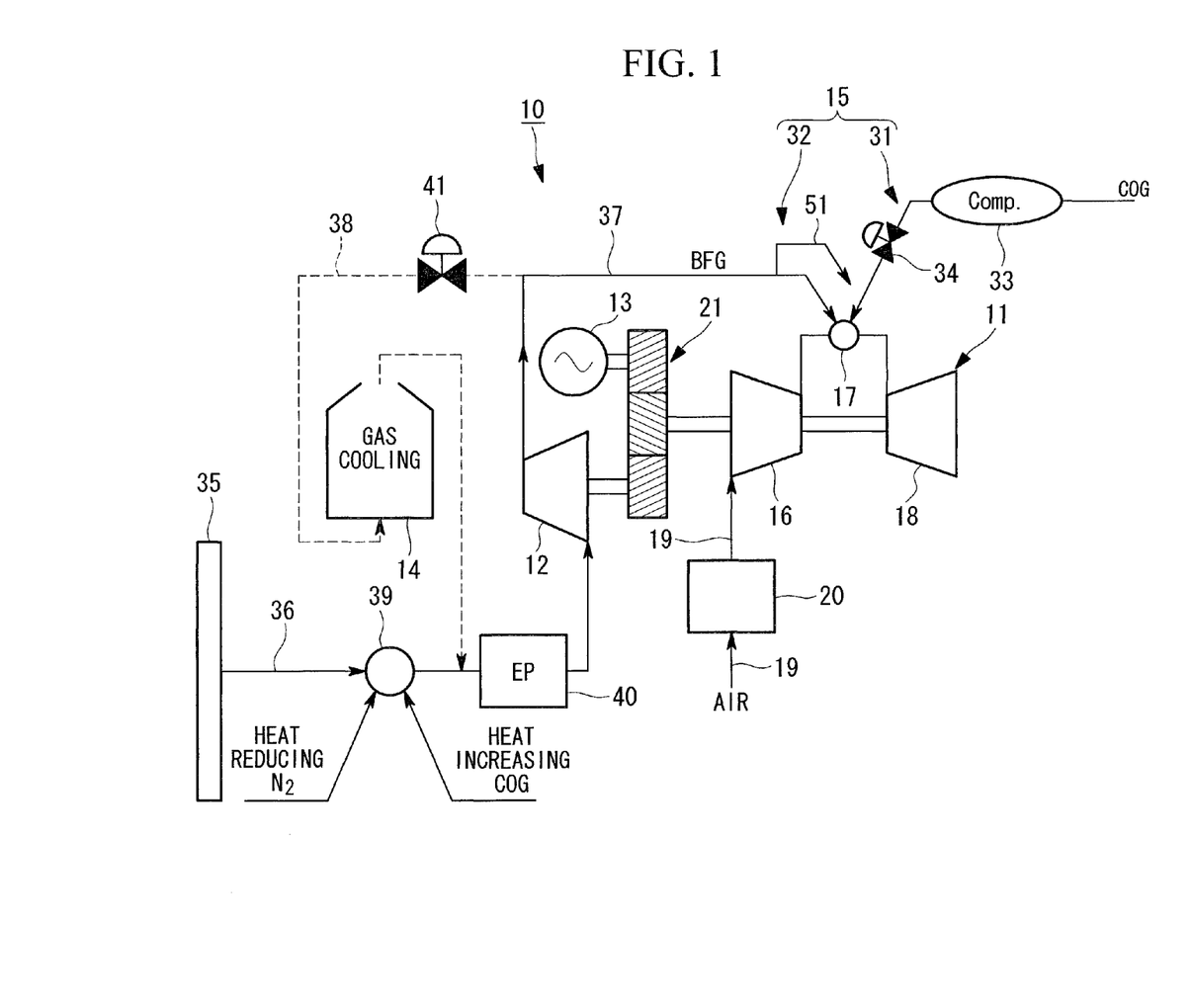
FIG. 1 is a schematic configuration diagram of a power generation plant including a fuel supply system for a gas turbine combustor according to one embodiment of the present invention.
Figure 2:
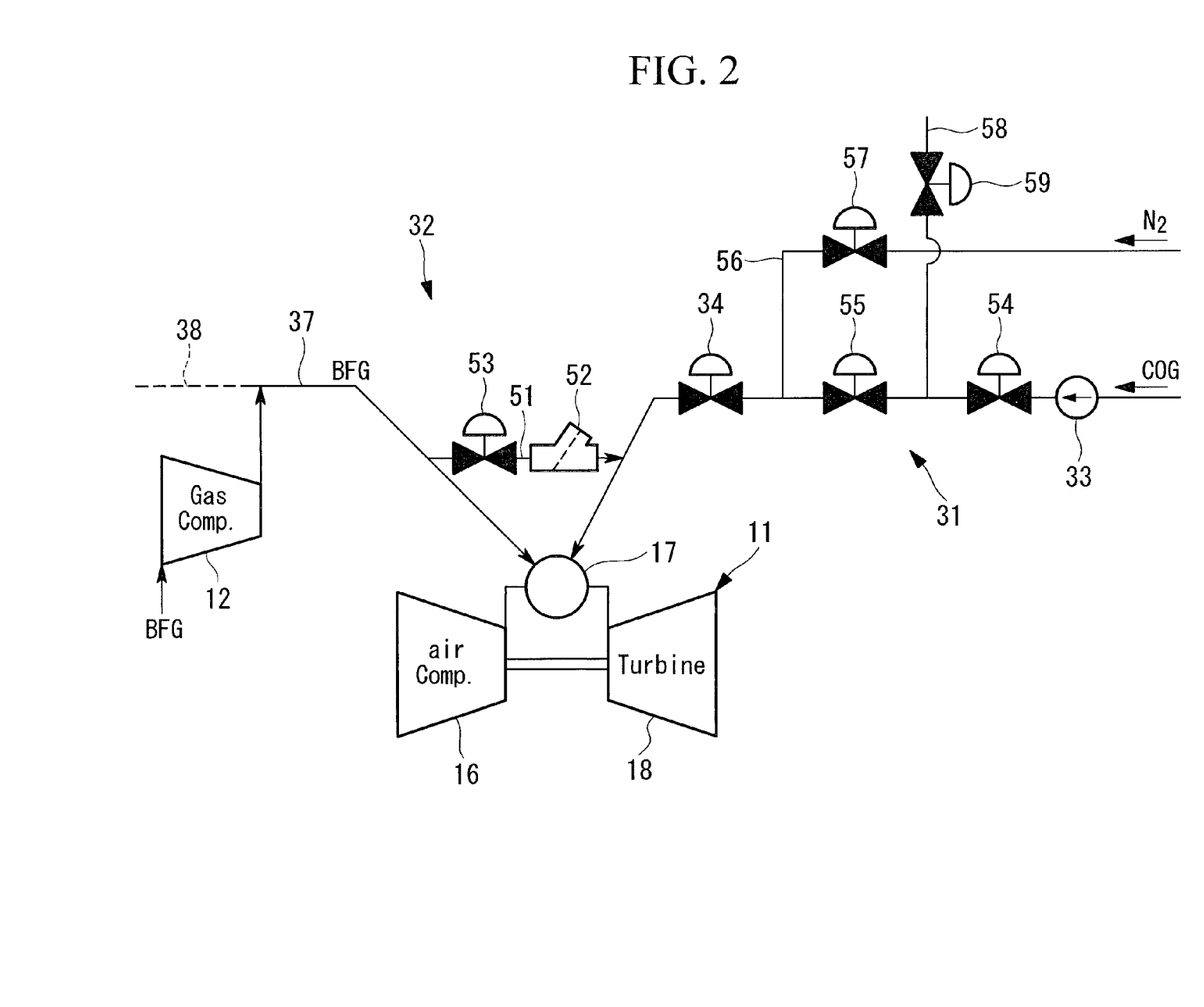
FIG. 2 is a detailed view showing by enlarging an essential part of FIG. 1.
Figure 3:
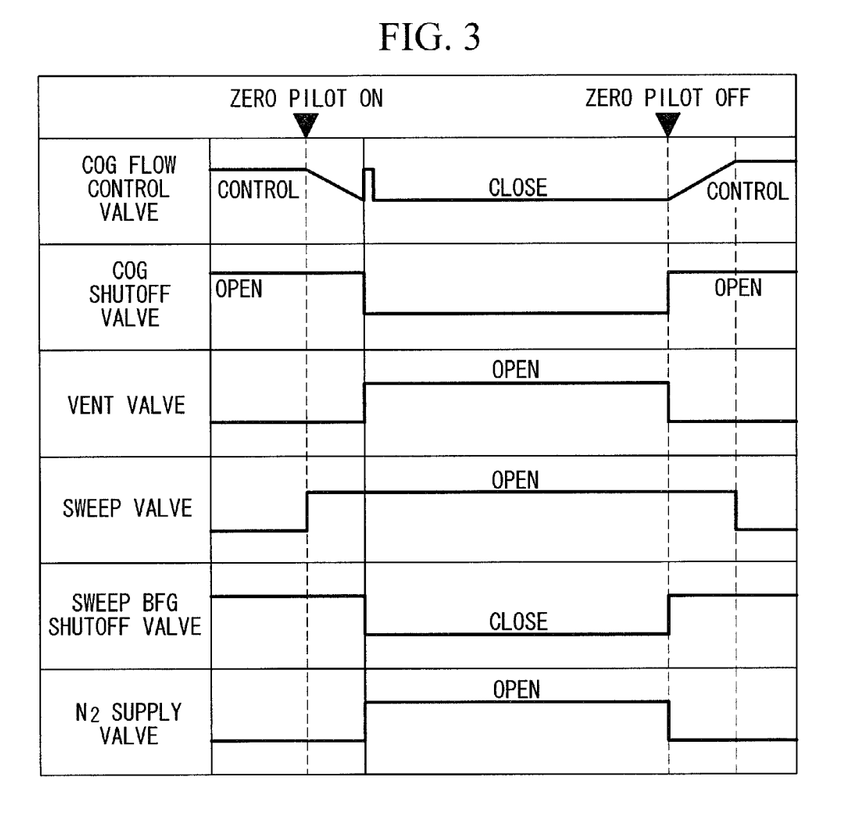
FIG. 3 is a timing chart showing an open and closed state of each valve shown in FIG. 2.
Figure 4:
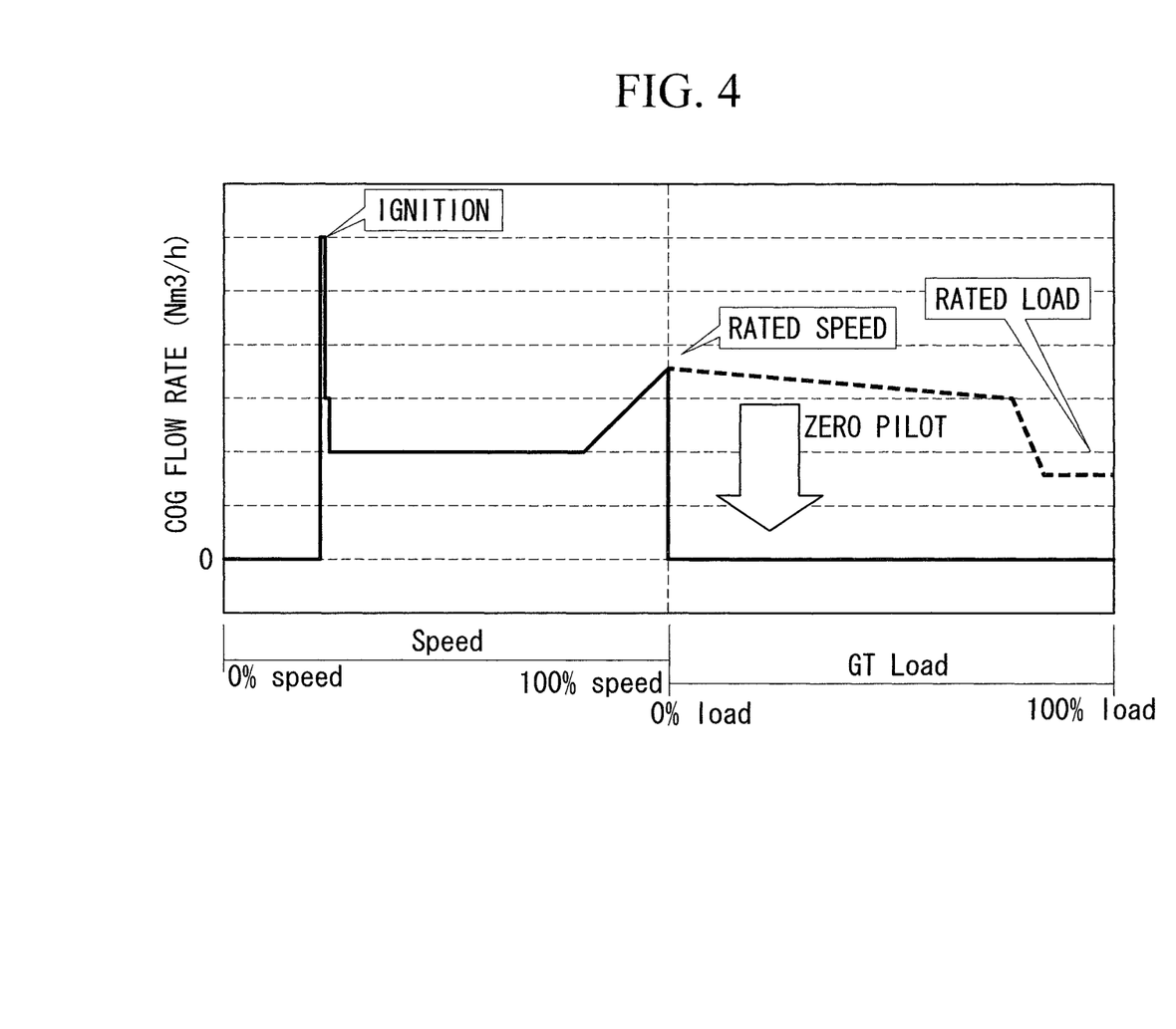
FIG. 4 is a graph showing a relation of a speed (rotation speed) of a gas turbine, a load and a COG flow rate.

FIG. 1 is a schematic configuration diagram of a power generation plant including the fuel supply system for a gas turbine combustor according to the present embodiment. FIG. 2 is a detailed view showing by enlarging an essential part of FIG. 1. FIG. 3 is a timing chart showing an open and closed state of each valve shown in FIG. 2. FIG. 4 is a graph showing a relation of a speed (rotation speed) of a gas turbine, a load and a COG flow rate.

As shown in FIG. 1, a power generation plant 10 according to the present embodiment includes a gas turbine 11, a BFG compressor 12, a generator 13, a gas cooler 14, and a fuel supply system for the gas turbine combustor (hereinafter, called a "fuel supply system") 15.

The gas turbine 11 includes an air compressor 16, a (gas turbine) combustor 17 and a turbine 18, and a filter 20 is provided in a mid-portion of an air introduction pipe 19 which guides air (external air) to the air compressor 16. Further, the gas turbine 11, the BFG compressor 12 and the generator 13 are connected via a main gear device 21, and when the gas turbine 11 is rotated, the BFG compressor 12 and the generator 13 are also rotated together.

The fuel supply system 15 includes a first fuel supply system 31 which guides a high-calorific fuel to the combustor 17, and a second fuel supply system 32 which guides a low-calorific fuel to the combustor 17.

The first fuel supply system 31 is a fuel supply line which guides COG (coke oven gas) to a pilot nozzle (first fuel nozzle) not illustrated which constitutes the combustor 17, and in a mid-portion of the fuel supply line, a COG compressor 33, and a sweep BFG shutoff valve (second shutoff valve) 34 are provided.

The second fuel supply system 32 is a fuel supply line which guides BFG (blast furnace gas) to a gas nozzle (second fuel nozzle) not illustrated which constitutes the combustor 17, and includes an upstream side line 36 which guides BFG generated in a blast furnace 35 to the BFG compressor 12, a downstream side line 37 which guides BFG compressed by the BFG compressor 12 (delivered (discharged) from the BFG compressor 12) to the gas nozzle, and a bypass line 38 which allows a mid-portion of the upstream side line 36 and a mid-portion of the downstream side line 37 to communicate with each other, and returns BFG which passes through the downstream side line 37 to the upstream side line 36 in accordance with necessity.

In a mid-portion of the upstream side line 36, a mixer 39 which mixes $N_2$ for heat reduction and/or COG for heat increase into the BFG which is guided from the inside of the blast furnace 35 to adjust the BFG to the BFG having a suitable quantity of heat (calorie) (only the BFG guided to the combustor 17 through the second fuel supply system 32, and having the quantity of heat with which the combustor 17 can keep a combustion state), and a dust precipitator (for example, an electrostatic precipitator) 40 which separates/removes particles such as dust from the BFG which is guided to the BFG compressor 12 from the mixer 39 are provided.

In a mid-portion of the bypass line 38, a bypass valve (flow rate control valve) 41 which controls the flow rate of the BFG which is returned to the mid-portion of the upstream side line 36 located between the mixer 39 and the dust precipitator 40 from the mid-portion of the downstream side line 37, and the gas cooler 14 which is located at a downstream side of the bypass valve 41 and cools the BFG which is returned to the mid-portion of the upstream side line 36 located between the mixer 39 and the dust precipitator 40 from the mid-portion of the downstream side line 37 are provided.

As shown in FIGS. 1 and 2, in a mid-portion of the downstream side line 37, a sweep line 51 is provided, which allows the mid-portion of the downstream side line 37 and a mid-portion of the first fuel supply system 31 located between the sweep BFG shutoff valve 34 and the combustor 17 to communicate with each other, and guides a part of the BFG which passes through the downstream side line 37 to the mid-portion of the first fuel supply system 31 in accordance with necessity.

Further, as shown in FIG. 2, in a mid-portion of the sweep line 51, a strainer 52, and a sweep valve (flow rate control valve) 53 for switching inflow/shutoff of the BFG which is guided (swept) to the combustor 17 from the mid-portion of the downstream side line 37 are provided. By opening the sweep valve 53, a part of the BFG which is compressed by the BFG compressor 12 (delivered (discharged) from the BFG compressor 12) is guided to the pilot nozzle (first fuel nozzle) not illustrated through the sweep line 51 and is ejected from the pilot nozzle.

In mid-portions of the first fuel supply system 31 which are located between the COG compressor 33 and the sweep BFG shutoff valve 34, a COG shutoff valve (first shutoff valve) 54, and a COG flow control valve (flow rate control valve) 55 which controls the flow rate of the COG which is guided to the combustor 17 through the first fuel supply system 31 are provided from an upstream side. Further, to a mid-portion of the first fuel supply system 31 which is located between the COG flow control valve 55 and the sweep BFG shutoff valve 34, an $N_2$ seal line 56 which supplies $N_2$ for seal is connected, and in a mid-portion of the $N_2$ seal line 56, an $N_2$ supply valve 57 is provided. Further, to a mid-portion of the first fuel supply system 31 which is located between the COG shutoff valve 54 and the COG flow control valve 55, a vent line 58 is connected, and in a mid-portion of the vent line 58, a vent valve 59 is provided.

Next, with use of FIG. 3, open and closed states of the COG flow control valve 55, the COG shutoff valve 54, the vent valve 59, the sweep valve 53, the sweep BFG shutoff valve 34 and the $N_2$ supply valve 57 will be described.

As shown in FIG. 4, at the time of start of operation (at the time of startup) of the gas turbine 11, the gas turbine 11 is rotated by a starter (not illustrated), and when the rotation speed of the gas turbine 11 reaches an ignition rotation speed (for example, 21% speed of the rated speed (rated rotation speed)), the COG shutoff valve 54 and the sweep BFG shutoff valve 34 are brought into a fully opened state. Further, the COG flow control valve 55 is opened to the ignition opening degree, whereby COG is supplied to the combustor 17 through the first fuel supply system 31, and BFG is supplied to the combustor 17 through the second fuel supply system 32 to be ignited by an igniter (not illustrated). Subsequently, BFG is supplied to the combustor 17 through the second fuel supply system 32, and a combustion state is formed in the combustor 17.

The vent valve 59, the sweep valve 53 and the $N_2$ supply valve 57 are in a fully closed state at this time.

When ignition is confirmed, the COG flow control valve 55 is temporarily throttled (closed) to a second predetermined opening degree, and the rotation speed of the gas turbine 11 is gradually increased to a predetermined rotation speed (for example, 81% speed). When the rotation speed of the gas turbine 11 reaches the rotation speed (for example, 81% speed), the COG flow control valve 55 is gradually operated to an opening direction, and the rotation speed of the gas turbine 11 is gradually increased to 100% speed (rated speed: rated rotation speed). When the rotation speed of the gas turbine 11 reaches 100% speed, and a predetermined time (for example, 30 minutes) elapses, the gas turbine 11 starts (shifts to) 0% load (no-load) operation. At the same time, a command signal to start zero pilot is sent to a controller (not illustrated), the gas turbine 11 goes into (shifts to) a zero pilot operation.

At the same time as the gas turbine 11 goes into a zero pilot operation, the COG flow control valve 55 which is subjected to an open and close control (operation) by the controller (not illustrated) is gradually operated to be brought into a fully closed state, and the sweep valve 53 is opened at once from the fully closed state to be brought into a fully opened state. At this time, the COG shutoff valve 54 and the sweep BFG shutoff valve 34 remain in the fully opened state, and the vent valve 59 and the $N_2$ supply valve 57 remain in the fully closed state.

Subsequently, at the same time as the COG flow control valve 55 is in a fully closed state, the COG shutoff valve 54 and the sweep BFG shutoff valve 34 are closed at once from the fully opened state to be brought into a fully closed state, and the vent valve 59 and the $N_2$ supply valve 57 are opened at once from the fully closed state to be brought into a fully opened state. At this time, the COG flow control valve 55 which is brought into a fully closed state is opened at once to be brought into a fully opened state for only a moment, and thereafter, is closed at once to be brought into a fully closed state, so that COG which stays (exists) between the $N_2$ supply valve 57 and the COG flow control valve 55 is purged (released outside the system) through the vent line 58 and the vent valve 59.

In a zero pilot operation, that is, the operation in which BFG is ejected into the combustor 17 through the pilot nozzle (first fuel nozzle) and the gas nozzle (second fuel nozzle) not illustrated which constitute the combustor 17, and is combusted, as shown in FIG. 4, supply of COG into the combustor 17 is shut off, and the flow rate (consumption amount: supply amount) of the COG becomes 0 (zero).

When the gas turbine 11 goes into a zero pilot operation, the load on the gas turbine 11 is gradually increased to 100% load (rated load), and the gas turbine 11 goes into a rated operation.

The broken line in FIG. 4 shows the flow rate (consumption amount: supply amount) of the COG which is ejected (supplied) from the pilot nozzle (first fuel nozzle) not illustrated which constitutes the combustor 17 when the conventional fuel supply system for the gas turbine combustor and fuel supply method for the gas turbine combustor are used.

Further, in order to finish the zero pilot operation and to shift to the operation of supplying COG to the combustor 17 through the first fuel supply system 31 and supplying BFG to the combustor 17 through the second fuel supply system 32, a command signal for finishing zero pilot is sent to the controller (not illustrated), and at the same time, the COG flow control valve 55 which is brought into the fully closed state by the controller (not illustrated) is gradually operated in the opening direction, while the COG shutoff valve 54 and the sweep BFG shutoff valve 34 are opened at once from the fully closed state to be brought into a fully opened state, and the vent valve 59 and the $N_2$ supply valve 57 are closed at once from the fully opened state to be brought into a fully closed state. When the COG flow control valve 55 is brought into the state subjected to open and close control (operation) by the controller (not illustrated), the sweep valve 53 is closed at once from the fully opened state to be brought into a fully closed state, and supply of BFG to the first fuel supply system 31 (in more detail, the pilot nozzle not illustrated which constitutes the combustor 17) from the sweep line 51 is shut off.

According to the fuel supply system 15 for a gas turbine combustor and the fuel supply method for the gas turbine combustor according to the present embodiment, the consumption amount of high-calorific gas such as coke oven gas (COG) during operation of the gas turbine 11 can be reduced, and the frequencies of clogging of the first fuel supply system (pilot system) 31 and the malfunction of the COG compressor 33 which compresses the high-calorific gas can be reduced.

Further, according to the fuel supply system 15 for the gas turbine combustor and the fuel supply method for the gas turbine combustor according to the present embodiment, when supply of a high-calorific fuel to the combustor 17 is shut off, and only a low-calorific fuel is supplied to the combustor 17, the low-calorific fuel is ejected from both of the pilot nozzle (first fuel nozzle) and the gas nozzle (second fuel nozzle), and is combusted, and therefore, the combustion gas in the combustor 17 can be prevented from flowing back to the inside of the pilot nozzle (first fuel nozzle) and causing a fire.

Further, according to the fuel supply system 15 for a gas turbine combustor according to the present embodiment, the sweep BFG shutoff valve 34 is provided at the upstream side from the position to which the downstream end of the sweep line 51 is connected, and at the downstream side of the COG shutoff valve 54, of the first fuel supply system 31, and therefore, the low-calorific fuel which flows into the first fuel supply system 31 through the sweep line 51 can be prevented from flowing into the first fuel supply system 31 which is located at the upstream side from the sweep BFG shutoff valve 34.

Furthermore, according to the fuel supply system 15 for the gas turbine combustor according to the present embodiment, the $N_2$ seal line 56 which supplies $N_2$ for seal is connected to the first fuel supply system 31 which is located between the COG shutoff valve 54 and the sweep BFG shutoff valve 34, and therefore, at the time of operation (zero pilot operation) in which only a low-calorific fuel is supplied to the combustor 17, the gas between the COG shutoff valve 54 and the sweep BFG shutoff valve 34 is replaced with $N_2$, whereby combustible gas can be prevented from staying in the first fuel supply system 31.

Since the gas turbine 11 according to the present embodiment includes the fuel supply system 15 for the gas turbine combustor according to the present embodiment, the consumption amount of high-calorific gas such as coke oven gas (COG) during operation of the gas turbine 11 can be reduced, and running cost can be reduced. Further, halt of the gas turbine 11 due to clogging of the first fuel supply system 31 and the malfunction of the COG compressor 33, which compresses the high-calorific gas, is prevented, the availability can be improved. Furthermore, maintenance cost can be reduced, and reliability of the gas turbine 11 can be improved.

Since the power generation plant 10 according to the present embodiment is equipped with (adopts) the gas turbine 11 according to the present embodiment, that is, the gas turbine 11 which is low in running cost and maintenance cost with high reliability, the running cost and the maintenance cost of the entire power generation plant 10 can be reduced, and reliability of the entire power generation plant 10 can be improved.

The present invention is not limited to the abovementioned embodiment, and can be arbitrarily modified and changed in accordance with necessity.

For example, in the aforementioned embodiment, COG (coke oven gas) as a high-calorific fuel, and BFG (blast furnace gas) as a low-calorific fuel are described as one specific example, but the kind of fuels may be those other than COG (coke oven gas) and BFG (blast furnace gas).

REFERENCE SIGNS LIST

10 POWER GENERATION PLANT
11 GAS TURBINE
15 FUEL SUPPLY SYSTEM (OF GAS TURBINE COMBUSTOR)
17 (GAS TURBINE) COMBUSTOR
31 FIRST FUEL SUPPLY SYSTEM
32 SECOND FUEL SUPPLY SYSTEM
34 SWEEP BFG SHUTOFF VALVE (SECOND SHUTOFF VALVE)
51 SWEEP LINE
53 SWEEP VALVE
54 COG SHUTOFF VALVE (FIRST SHUTOFF VALVE)
56 $N_2$ SEAL LINE

The invention claimed is:

1. A fuel supply method for a gas turbine combustor which supplies at least two kinds of fuels different in calorie to the gas turbine combustor,
wherein at a time of start of operation of a gas turbine, with use of both a first fuel supply system which supplies a high-calorific fuel for a first nozzle constituting the gas turbine combustor, and a second fuel supply system which supplies a low-calorific fuel for a second nozzle constituting the gas turbine combustor, the high-calorific fuel and the low-calorific fuel are supplied to the gas turbine combustor,
at a time point when the gas turbine reaches output power which enables continuous operation with only the low-calorific fuel, supply of the high-calorific fuel to the gas turbine combustor is shut off, and only the low-calorific fuel is supplied to the gas turbine combustor, when supply of the high-calorific fuel to the gas turbine combustor is shut off, and only the low-calorific fuel is supplied to the gas turbine combustor, the low-calorific fuel guided through the second fuel supply system is guided to the first nozzle through a sweep line which guides the low-calorific fuel to a mid-portion of the first fuel supply system, and the low-calorific fuel is ejected from both the second nozzle and the first nozzle, and when the supply only of the low-calorific fuel supplied to the gas turbine combustor is finished, the high-calorific fuel is supplied at once, the supply of the low-calorific fuel to the first fuel supply system through the sweep line is shut off at once, and the operation of supplying the high-calorific fuel to the gas turbine combustor through the first fuel supply system and supplying the low-calorific fuel to the gas turbine combustor through the second fuel supply system is started.

2. The fuel supply method for a gas turbine combustor according to claim 1, wherein, in the first fuel supply system, a second shutoff valve is provided at an upstream side of a position to which a downstream end of the sweep line is connected and at a downstream side of a first shutoff valve which is provided at an upstream side from a position to which a downstream end of the sweep line is connected, and the second shutoff valve shuts off the low-calorific fuel which flows into the first fuel supply system through the sweep line to prevent the low-calorific fuel from flowing into the first fuel supply system being located at the upstream side from the second shutoff valve.

3. The fuel supply method for a gas turbine combustor according to claim 2, wherein when only the low-calorific fuel is supplied to the gas turbine combustor, gas between the first shutoff valve and the second shutoff valve is replaced with $N_2$.

4. The fuel supply method for a gas turbine combustor according to claim 2, wherein when only the low-calorific fuel is supplied to the gas turbine combustor, a combustible gas staying the first fuel supply system which is located between the first shutoff valve and the second shutoff valve is replaced with $N_2$.

5. The fuel supply method for a gas turbine combustor according to claim 1, wherein the first fuel supply system comprises a first shutoff valve which is provided at an upstream side from a position to which a downstream end of the sweep line is connected, of the first fuel supply system, and shuts off supply of the high-calorific fuel which is guided to the first nozzle through the first fuel supply system, a second shutoff valve which is provided at an upstream side of a position to which a downstream end of the sweep line is connected, and at a downstream side of the first shutoff valve, of the first fuel supply system, a flow rate control valve which is provided at the first fuel supply system located between the first shutoff valve and the second shutoff valve and which controls a flow rate of the high-calorific fuel, a vent line which is connected to a mid-portion of the first fuel supply system which is located between the first shutoff valve and the second shutoff valve, and a vent valve which is provided in a mid-portion of the vent line, wherein the sweep line comprises a sweep valve which is provided at a mid-portion thereof and is for switching inflow/shutoff of the low-calorific fuel guided to the first fuel supply system from the second fuel supply system, wherein at a time of start of operation of a gas turbine, when the rotation speed of the gas turbine reaches a predetermined rotation speed, the first shutoff valve and the second shutoff valve are brought into a fully opened state, the flow rate control valve is opened to a predetermined opening degree, whereby the high-calorific fuel is supplied to the gas turbine combustor through the first fuel supply system, and the low-calorific fuel is supplied to the gas turbine combustor through the second fuel supply system, wherein when supply of the high-calorific fuel to the gas turbine combustor is shut off, and only the low-calorific fuel is supplied to the gas turbine combustor, the flow rate control valve is gradually operated to be brought into a fully closed state, the sweep valve is opened at once from the fully closed state to be brought into a fully opened state, while the first shutoff valve and the second shutoff valve remain in the fully opened state, and the vent valve remains in the fully closed state, wherein, at the same time as the flow rate control valve is in a fully closed state, the first shutoff valve and the second shutoff valve are closed at once from the fully opened state to be brought into a fully closed state, and the vent valve is opened at once from the fully closed state to be brought into a fully opened state, while the flow rate control valve which is brought into a fully closed state is opened at once to be brought into a fully opened state for only a moment, and thereafter, is closed at once to be brought into a fully closed state, wherein when the supply only of the low-calorific fuel supplied to the gas turbine combustor is finished, the flow rate control valve which is brought into the fully closed state is gradually operated in the opening direction, while the first shutoff valve and the second shutoff valve are opened at once from the fully closed state to be brought into a fully opened state, the vent valve is closed at once from the fully opened state to be brought into a fully closed state, the sweep valve is closed at once from the fully opened state to be brought into a fully closed state, and supply of the low-calorific fuel to the first fuel supply system from the sweep line is shut off to shift to the operation of supplying the high-calorific fuel to the gas turbine combustor through the first fuel supply system and supplying the low-calorific fuel to the gas turbine combustor through the second fuel supply system.

* * * * *